(12) United States Patent
Serrano

(10) Patent No.: US 10,173,450 B2
(45) Date of Patent: Jan. 8, 2019

(54) ELEMENT MARKING DEVICE

(71) Applicant: Vekta Automation Pty Ltd, Osborne Park, WA (US)

(72) Inventor: Edward D. Serrano, Beckenham (AU)

(73) Assignee: Vekta Automation Pty Ltd., Osborne Park (AU)

( * ) Notice: Subject to any disclaimer, the term of this patent is extended or adjusted under 35 U.S.C. 154(b) by 0 days.

(21) Appl. No.: 14/970,775

(22) Filed: Dec. 16, 2015

(65) Prior Publication Data

US 2016/0096387 A1 Apr. 7, 2016

Related U.S. Application Data

(63) Continuation of application No. 14/444,032, filed on Jul. 28, 2014.

(30) Foreign Application Priority Data

Oct. 16, 2013 (AU) .................................. 2013245494

(51) Int. Cl.

| | |
|---|---|
| *E04C 3/16* | (2006.01) |
| *B41M 5/00* | (2006.01) |
| *B05C 9/02* | (2006.01) |
| *B05C 9/10* | (2006.01) |
| *E04C 3/17* | (2006.01) |

(Continued)

(52) U.S. Cl.
CPC .......... *B41M 5/0076* (2013.01); *B05C 9/022* (2013.01); *B05C 9/10* (2013.01); *B27M 1/08* (2013.01); *B41J 3/407* (2013.01); *B41J 11/0095* (2013.01); *B41M 1/00* (2013.01); *E04C 3/16* (2013.01); *E04C 3/17* (2013.01); *G01D 5/00* (2013.01); *B41M 5/0047* (2013.01)

(58) Field of Classification Search
CPC ......... G05B 2219/45211; B23D 59/008; B23P 19/10; E04C 3/17; Y10T 29/53004; Y10T 29/53017; E04G 21/1891; E04B 2001/3572
See application file for complete search history.

(56) References Cited

U.S. PATENT DOCUMENTS

| | | |
|---|---|---|
| 2,744,639 A | 5/1956 | Evans |
| 3,079,963 A | 3/1963 | Jensen |

(Continued)

*Primary Examiner* — Jennifer Simmons
(74) *Attorney, Agent, or Firm* — Winthrop & Weinstine P.A.

(57) ABSTRACT

A marking device for marking a truss element of a truss may include a print mechanism arranged to print selected truss information on lumber elements moving on a conveyance system passed the print mechanism, the selected truss information including one of an element identifying truss diagram, a truss plate location, and an intersecting member identifier, a position sensing device configured to sense the position of the lumber relative to the print mechanism, and a computing component, the computing component including a geometry extraction module for extracting the geometry of the element to be marked, an element marking generator for generating print instructions for the selected truss information, a position sensing module for interfacing with the position sensing device to ascertain the position of the lumber element, and a print control module for controlling the print mechanism to print the selected truss information.

11 Claims, 5 Drawing Sheets

(51) Int. Cl.
*B27M 1/08* (2006.01)
*G01D 5/00* (2006.01)
*B41M 1/00* (2006.01)
*B41J 3/407* (2006.01)
*B41J 11/00* (2006.01)

(56) References Cited

U.S. PATENT DOCUMENTS

| | | | |
|---|---|---|---|
| 3,247,963 A | 4/1966 | Fehely | |
| 3,329,181 A | 7/1967 | Buss et al. | |
| 3,491,809 A | 1/1970 | Schneider | |
| 3,566,936 A | 3/1971 | Golick | |
| 3,685,129 A | 8/1972 | Jureit et al. | |
| 3,811,353 A | 5/1974 | Miles | |
| 3,910,142 A | 10/1975 | Jureit et al. | |
| 3,970,128 A | 7/1976 | Kohlberg | |
| 3,983,403 A | 9/1976 | Dahlstrom et al. | |
| 4,023,605 A | 5/1977 | Hellstrom et al. | |
| 4,093,007 A | 6/1978 | Hellstrom | |
| 4,120,333 A | 10/1978 | Hellgren et al. | |
| 4,220,115 A | 9/1980 | Brossman et al. | |
| 4,281,696 A | 8/1981 | Howard et al. | |
| 4,305,538 A | 12/1981 | Schultz | |
| 4,392,204 A | 7/1983 | Prim et al. | |
| 4,399,849 A | 8/1983 | Nowakowski | |
| 4,484,675 A | 11/1984 | Doherty et al. | |
| 4,794,963 A | 1/1989 | Oppeneer | |
| 4,879,752 A | 11/1989 | Aune et al. | |
| 4,926,917 A | 5/1990 | Kirbach | |
| 4,936,437 A | 6/1990 | Gearhart | |
| 4,977,805 A | 12/1990 | Corley, III | |
| 5,208,962 A | 5/1993 | Walker, Jr. | |
| 5,335,790 A | 8/1994 | Geiger et al. | |
| 5,381,712 A | 1/1995 | Head, Jr. et al. | |
| 5,417,265 A | 5/1995 | Davenport et al. | |
| 5,605,216 A | 2/1997 | Raybon et al. | |
| 5,685,410 A | 11/1997 | Ritola et al. | |
| 5,992,484 A | 11/1999 | Jackson | |
| 6,089,135 A | 7/2000 | Murray | |
| 6,539,830 B1 | 4/2003 | Koskovich | |
| 9,720,401 B2 | 8/2017 | Platt | |
| 2005/0217185 A1 | 10/2005 | Moulton et al. | |
| 2007/0256391 A1* | 11/2007 | Mifsud | B21F 27/128 52/745.05 |
| 2008/0052941 A1* | 3/2008 | Nyberg | B25H 7/00 33/566 |
| 2008/0243089 A1 | 10/2008 | Keaton | |
| 2010/0030363 A1 | 2/2010 | McAdoo et al. | |
| 2010/0061829 A1 | 3/2010 | McAdoo et al. | |
| 2010/0189492 A1 | 6/2010 | Green | |
| 2013/0080122 A1 | 3/2013 | Bumbalough et al. | |
| 2014/0102590 A1 | 4/2014 | Towey | |

* cited by examiner

ELEMENT MARKING DEVICE

CROSS-REFERENCE TO RELATED APPLICATIONS

The present application is a continuation of U.S. application Ser. No. 14/444,032, filed on Jul. 28, 2014, which claims priority to Australian Patent Application No. 2013245494 entitled Provision of Assembly Information for Truss Fabrication, filed on Oct. 16, 2013, the content of which are hereby incorporated by reference herein in their entirety.

FIELD OF THE INVENTION

The present application relates to a marking device for printing, inscribing, etching, or otherwise providing markings on an element for use in assembling a component. More particularly, the present application relates to a marking device for printing markings on an element of a truss for use in assembling the truss. Still more particularly, the present application relates to a marking device for printing a truss diagram and/or truss plate locations on an element of a truss.

BACKGROUND OF THE INVENTION

Truss manufacturing, and in particular, wood truss manufacturing initially involves cutting a series of raw lumber boards to make truss elements including, for example, top chords, bottom chords, and web members for use in assembling the truss. The raw lumber boards may commonly be dimensioned lumber boards such as 2×4's of various lengths. The cutting process may be automated and may involve efforts to minimize waste by selecting raw lumber board lengths that are very close to the actual length needed to make one or more elements.

After an element is cut, it may be arranged in its respective position in the truss on an assembly table, for example. In some cases, laser light diagrams may be projected onto the table showing the arrangement of truss elements to form the truss. Several truss elements may be arranged on the table and truss plates may be positioned at the intersection of the several elements. At each intersection, a truss plate may be placed under the assembly and on top of the assembly. When all of the elements of the truss are in position and the plates are placed, a press may be used to press the truss plates into the truss elements thereby securing the several elements at their respective intersections to form the truss.

During the above process, it should be appreciated that after a board is cut, it still looks basically like a plain 2×4 except that it may have a miter cut on one or both ends. As such, without more, it can be difficult to know how a particular element fits into the truss as a whole. Still further, once the position of the element is determined, the truss plates that secure it to adjoining elements need to be properly positioned. There are relatively strict tolerances on truss plate positioning because the truss plates are the only thing at each intersection that maintains the relative position of the truss elements during shipping and under load once the truss is installed in a structure. As such, typical truss plate locating involves measuring from particular points on the truss to edges of the plates to determine their position. For example, at the peak of a gabled truss, the top edge of the truss plate may be specified to be 3 inches down from the peak and the plate may be specified to be centered on the middle vertical member such that, for a 6 inch wide plate and a 3½ inch wide center vert, for example, the left and right edges of the plate may be specified as being 1¼ inches left and right of the edge of the center vertical member. Where multiple trusses are being assembled and, in particular, where many trusses are unique, the positioning of the members and the positioning of the plates can account for a large amount of time.

BRIEF SUMMARY OF THE INVENTION

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

In one or more embodiments, a marking device for marking a truss element of a truss may be provided. The device may include a print mechanism arranged to print selected truss information on lumber elements moving on a conveyance system passed the print mechanism. The selected truss information may include one of an element identifying truss diagram, a truss plate location, and an intersecting member identifier. The device may also include a position sensing device configured to sense the position of the lumber relative to the print mechanism. The device may also include a computing component, including a geometry extraction module for extracting the geometry of the element to be marked. The computing component may also include an element marking generator for generating print instructions for the selected truss information and a position sensing module for interfacing with the position sensing device to ascertain the position of the lumber element. The computing component may also include a print control module for controlling the print mechanism to print the selected truss information.

In other embodiments, a method of marking a truss element may include receiving truss information defining the geometry of a truss. The method may also include extracting member geometry for one of the elements of the truss and generating a marking that includes one of an element identifying truss diagram, a truss plate location, and a intersecting member identifier. The method may also include sensing the position of a piece of lumber as it is conveyed passed a print mechanism and actuating the print mechanism to print the marking on the lumber.

In still other embodiments, a truss element may include a length configured for arrangement in a truss. The truss element may also include one or more sawn ends cut for abutting an intersecting member in a truss. The truss element may also include a marking including one of an element identifying truss diagram, a truss plate location, and an intersecting member identifier.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

Figure 1:
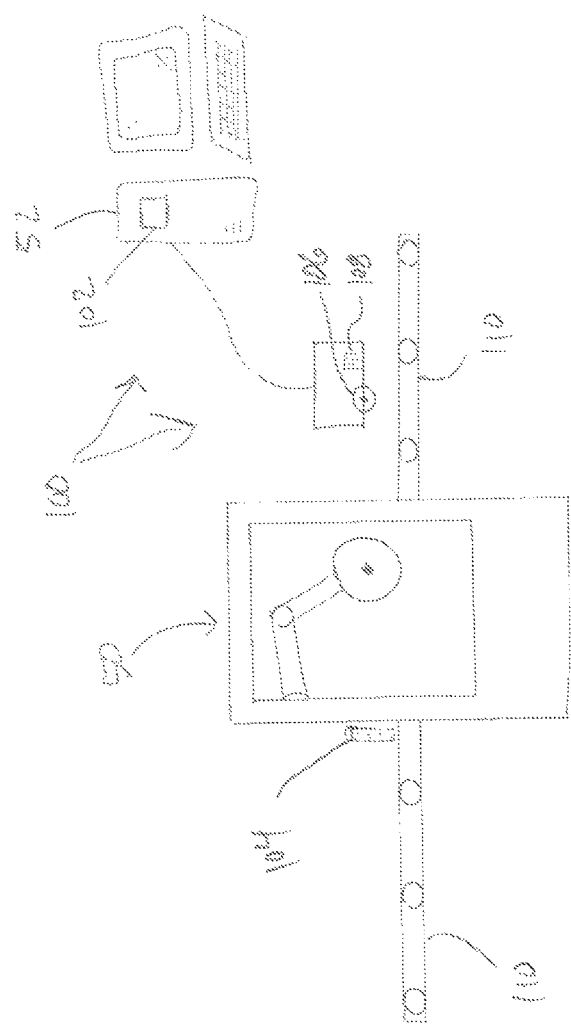
FIG. 1 is a schematic diagram of an element marking device in conjunction with a linear saw, according to some embodiments.

The present disclosure, in some embodiments, relates to a print device for use in conjunction with a saw for cutting truss elements. The print device may include a computing device for inputting truss information including truss geometry, member sizes, and truss plate locations. The device may include systems for isolating each member of the truss and extracting each member's individual geometry including miter geometry at the ends and the like such that elements may be created to assemble the truss. The print device may be configured to print a full diagram of the truss on each element and highlight, or otherwise identify within the diagram, the member of the truss that the element forms. The diagram may be oriented on the element such that when the element is oriented such that the diagram is oriented in elevation, the truss element may be oriented in its particular truss orientation. In addition, the print device may be configured to print a boundary line or border showing the edge locations of the portion of the truss plate that connects the element to adjacent elements. These boundary lines may be provided, for example, at each end of the element where the element connects to other elements or along the length of the element where another element may intersect. Still further, the print device may be configured to print a label or identifier on the element at intersection locations identifying intersecting members.

The truss position and/or orientation diagram, truss plate location outlines, and intersecting member identifiers provided by the print device on the truss element may be very advantageous in assembling the truss because a truss that includes such information may be assembled much faster than previous methods would allow. That is, when an assembler picks up a truss element, the assembler can look at the truss diagram on the element and quickly understand which member of the truss the element forms and without reference to a separate document drawing, for example. Still further, the assembler may quickly understand the orientation of the element relative to the truss because of the orientation of the diagram on the element. As such, the assembler may quickly place the element in position on an assembly table. Still further, when the several truss elements are laid out on an assembly table the truss plate boundary lines on respective truss elements may make up a full outline of a truss plate location at each intersection allowing for truss plates to be quickly placed with lesser reliance on measuring offsets or employing jigs for proper positioning of the truss plates. Still further, when inspecting or otherwise evaluating the manufacturing of the trusses, the diagrams, plate location diagrams, and intersecting member identifiers may allow for quickly reviewing the assembled truss to verify suitability of positioning and placement of the elements. It is to be appreciated that while the present disclosure is directed, generally, toward sawn dimensioned lumber, similar or same approaches may be provided on metal stud or cold-formed members as well.

Referring now to FIG. 1, an element marking device 100 is shown. As shown, the device may be configured for use with a saw 50, such as a linear saw, that cuts the several elements of the truss such that as each element enters or exits the saw, the elements are marked and ready for assembly in a truss. It is to be appreciated that the computing device 52 used for the marking device 100 may be a part of the computing device 52 used for operating the saw and particular components or modules may be included for operating the marking device 100. While shown in conjunction with a saw 50, it is also to be appreciate that the marking device 100 may also be provided in isolation from such a saw 50. For example, the saw 50 and the marking device 100 may be arranged in assembly line fashion where the elements are cut and printed at separate stations, for example. Moreover, the computing device 52 and system for marking 100 may be separate from the computing device 52 for running the saw.

In the present embodiment, the system may include a computing component 102 for receiving and processing truss information and for controlling the marking process. The system may also include a position controlling 104 and/or position sensing 106 element for controlling and/or assessing the relative position of the element and a print head or heads 108. The system may also include such print head or heads 108 for performing the marking operation. In addition, the system may include a table, rack, or track 110 for controlling the pathway of the element as it is advanced through a saw and/or passed a print mechanism 108.

The computing component 102 may be provided on a computing device 52 that may be provided or supplied with the element marking device 100 or may be part of a computing device 52 included as part of a saw 50 or other processing system, for example. The computing device 52 may include a computer-readable storage medium configured for storing truss information and/or information about each element of a particular truss. The storage medium may also store the several algorithms used to manage and control the position controlling 104 and/or sensing 106 elements and the print heads 108. The computing device may also include a processor for performing the algorithms stored in the storage medium and for controlling the input process as well as managing the interfaces used by a user to interact with the computing device 52 to run one or more jobs. The computing device 52 may be in communication with a network such as a wide area network like the Internet and/or one or more local area networks. The computing device 52 may include a wired connection to a network or a wireless connection may be provided. In still other embodiments, the computing device 52 may include a port for interfacing with a portable storage device such as a jump drive or other portable storage device that may include truss information for processing. Still other computing device elements such as a display interface, a keyboard, mouse, and other user interfacing and communication systems may be provided.

Figure 2:
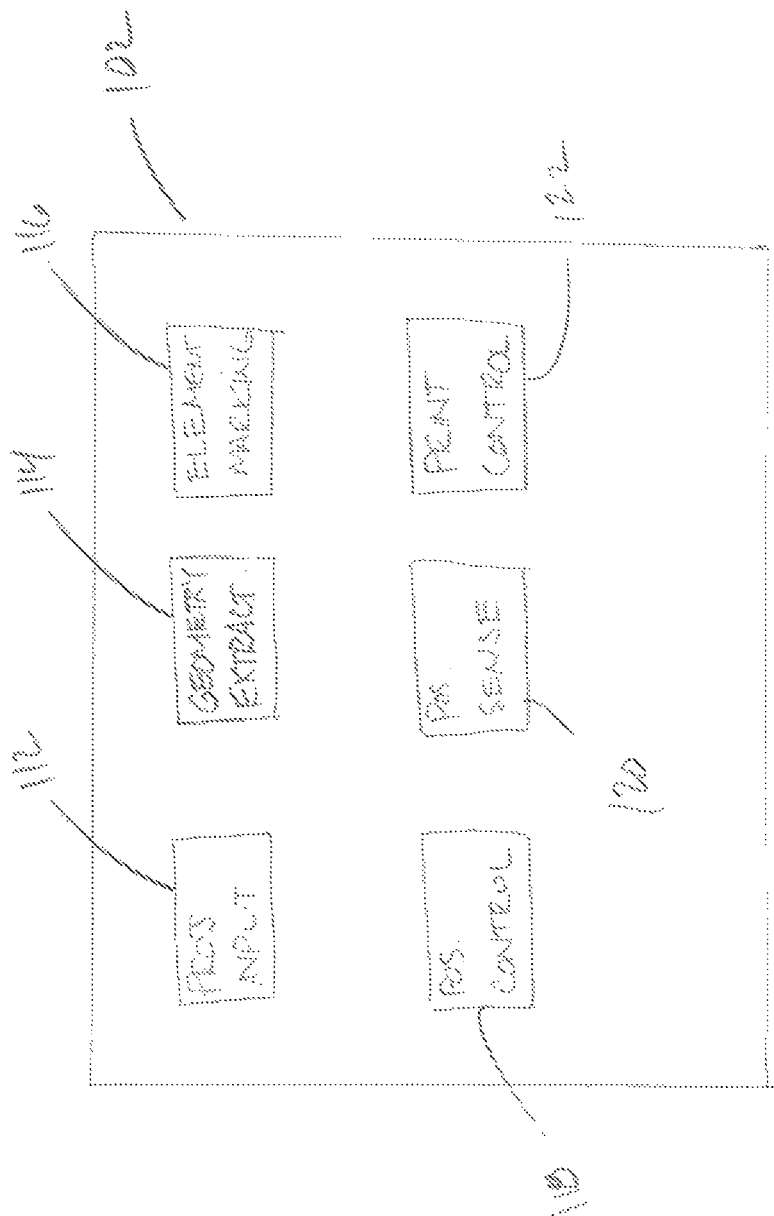
FIG. 2 is a schematic diagram of a computing component of the element marking device, according to some embodiments.

The computing component 102 may be installed on or provide with a computing device 52 and may include software, hardware, or a combination thereof for managing the marking process. In some embodiments, as shown in FIG. 2, the computing component 102 may include a project input module 112, a geometry extraction module 114, an element marking generator 116, a position control 118 and/or sensing module 120, and a print control module 122. Each of these modules may function to receive, process, and send or store data to perform a particular aspect of the marking operation.

The project input module 112 may be configured to receive truss information. In some embodiments, the project input module 112 may receive truss information in the form of data files having coordinate data in them defining one or more truss geometries, members sizes, positions, and orientations, and truss plate sizes, positions, and orientation. In some embodiments, the truss information may, for example, include a data file for cutting the members and a data file may be provided for printing diagrams of whole trusses, individual members, joints, and the like. In still other embodiments, additional data files or a single data file may be provided. Still other approaches to arranging and organizing the data may be provided.

In some embodiments, an entire project may be provided to the system for processing. For example, a project may include all or some of the roof trusses for a particular building or a project may include all or some of the roof trusses for several buildings or a project may include all or some of the roof and floor trusses for a single building or multiple buildings. Still other types of projects may be provide to the system. The project input module 112 may manage the project by organizing the projects into manageable portions by, for example, providing identifiers or receiving and organizing previously determined identifiers for each truss to be manufactured. The project input module 112 may also further develop or receive identifiers for each member of each of the trusses together with truss plate information including truss plate size and position information for each truss plate for each truss. In some embodiments, the truss information received and processed by the project input module 112 may include graphical information for each truss. For example, each truss may be defined by a "to scale" drawing or model including actual size members and truss plates arranged in actual relative positions. In other embodiments, truss information may include tables such as coordinate data tables defining the truss members, sizes, positions, and orientations and may also include truss plates sizes, positions, and orientations. Still other forms of truss information may be provided. The project input module 112 may store the truss information for use by additional modules.

The geometry extraction module 114 may be configured to isolate each member of the truss by extracting the geometry of each member from the truss information that may be used to cut an element for forming the member. In some embodiments, this module 114 may merely access the data file for a particular truss member where, for example, the data file already isolates members from trusses. This module, thus, may extract the geometry of an individual member of the truss such that the system may be able to provide markings on the element in precise locations. In some embodiments, the geometry extraction module 114 is part of a system used to cut lumber to form the elements. In other embodiments, the geometry extraction module 114 may be separate from the cutting process. The geometry extraction module 114 may access the truss information stored by the project input module and step through each member of each truss and create instructions for cutting and/or otherwise extract the geometry of each member such as in the form of an isolated model. For example, a web member of a truss such as the one shown in FIGS. 3 and 4, may include a doubly mitered end and a single miter end. The geometry extraction module 114 may isolate the member from the truss by capturing the overall member length of the member and capturing the miter angles and positions for each of the miter cuts. The geometry extraction module 114 may, thus, identify or capture the particular geometry for each member of a truss and may store that information.

Figures 3, 4:
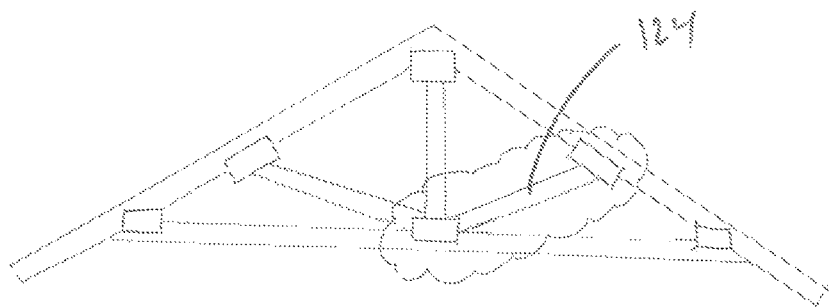
FIG. 3 is an elevation view of a truss, according to some embodiments.
FIG. 4 is a view of a member of the truss of FIG. 3 including close-up views of a truss diagram and a truss plate location, according to some embodiments.
Figure 5:
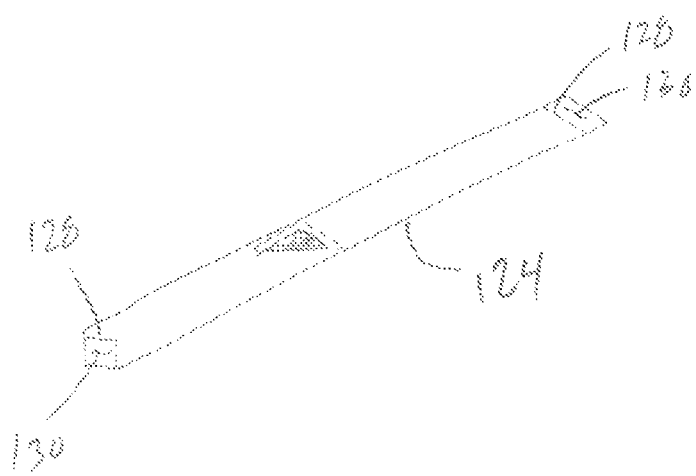
FIG. 5 is a view of the member of FIG. 4 with the truss diagram on the member in an elevation position such that the member is in its truss installed orientation.

The element marking generator 116 may define the markings to be placed on the element being used to form the truss member. With respect to the truss diagram, the element marking generator 116 may select a position on the element for placing the truss diagram and may generate a truss diagram based on provided data or adapt a provided diagram such that the particular element being prepared is shown as a highlighted member. The marking generator 116 may scale the truss diagram such that the entire truss may be shown on each element. As such, where large trusses are created without increasing the member size, the truss diagram may be relatively small and where small trusses are created without decreasing the member size, the truss diagram may be relatively large. In addition, the element marking generator 116 may orient the diagram such that, after printing, when the element is held or oriented with the diagram in a truss elevation position the element will be oriented in its truss orientation. As shown in a series of FIGS. 3-5, for example, a web member 124 such as the one identified by the cloud on FIG. 3 may be cut and/or printed on by the present system. As shown in FIG. 4, the member may exit the element marking device 100 with a diagram 126, a truss plate location 128, and an intersecting member identifier 130. As shown in FIG. 5, when the web member 124 is positioned such that the bottom chord of the truss in the truss diagram is horizontal (i.e., a truss elevation position) the web member 124 is oriented at an angle of approximately 30 degrees from the horizontal which is consistent with the member's orientation in the truss as shown in FIG. 3. As such, not only does the diagram identify which member of the truss the element forms, but it may also assist in positioning the element in the proper orientation for installation in the truss. The element marking generator 116 may then generate instructions for printing the diagram on the element. In some embodiments, the diagram may be printed as the element goes into or leaves a saw, for example. In these embodiments, the element marking generator 116 may, for example, define the feed distance to be measured such that the printing elements may be activate at the correct time during the feed process to position the diagram at the correct location.

In addition to the truss diagram, the element marking generator 116 may generate instructions for printing the truss plate locations, such as an outline or boundary line defining the location, on the element. In this regard, the element marking generator 116 may access the truss information captured by the project input module 112 that define the size and position of the truss plates. From this information, the element marking generator 116 may create print instructions for printing the outline or boundary of the portion of the truss plates that connect one or more members together. As shown in FIGS. 4 and 5, for example, the truss plate locations 128 may include boundary lines at each end of the member showing how the truss plate overlaps with that member when the member is installed in the truss. It is to be appreciated that additional lines on adjacent intersecting members may help to fully identify the truss plate location when the members of the truss are arranged in position for forming the truss. Where a "to scale" graphical depiction or model of the truss and the truss plates has been provided, the element marking generator 116 may capture the portion of the truss plate that overlaps with the element being marked and may generate printing instructions to re-create that outline/border on the element. As with the truss diagram, the element marking generator 116 may include in those instructions feed distances such that the plate diagrams are printed in the proper location relative to the element. In addition, the element marking generator 116 may take the orientation of the member into consideration in the sense that the member may be fed along the member's longitudinal axis.

The element marking generator 116 may also generate instructions to print intersecting member identifiers on the members. For example, the element marking generator 116 may extract from the truss information, the labels for the members that may intersect with the element at each end or along the length of the member. The element marking generator 116 may, thus, develop print instructions for printing the identifiers at respective locations. As such, when the truss is being assembled, the respective intersecting members may be verified by reviewing the intersecting member identifiers. The identifier, in some embodiments, may include an arrow, line, arrowhead, wedge, or other pointing diagram directed toward the edge where the adjacent member identified is to be positioned.

It is to be appreciated that the element marking generator 116 may be configured to generate instructions for printing with a one-pass approach. That is, for example, where the element marking device 100 is arranged in conjunction with a cutting device such as a saw, the element may be cut and may enter or leave the saw without reversing. Slight pauses may occur when the ends of the element are cut, but otherwise, the element may move generally continuously in a single direction through the saw. As such, the element marking generator 116 may develop instructions such that a multiple-head printer can provide the markings as the element passes by the print heads in a single pass, without stopping, without pausing, without reversing, and without moving laterally. In addition, when the element marking device 100 is arranged separate from or apart from a saw, a similar approach may be used. In other embodiments, an approach more akin to a plotter may be used, where the print heads move in a direction generally across the movement direction of the board and the board may move, pause, reverse, or otherwise be moved in conjunction with the movement of the print heads to create a diagram. Still other printer systems may be used and the element marking generator 116 may generate instructions configured to control the particular type of printer system being used or it may generate instructions for one or more systems to provide flexibility to the user.

The position control 118 and/or sensing module 120 may be configured to control elements for moving the truss element into position for printing while sensing its position or it may be configured to sense the position of the truss element that is being moved by another system such as a longitudinal conveyance system of a saw, for example. As such, the position control 118 and/or sensing module 120 may be responsible for controlling and/or assuring that the element to be printed on is in an anticipated position and is being conveyed at an anticipated speed when the print module 122 actuates the print heads 108, for example.

In the case of a position control module 118, the module may be configured to manage actuators, rollers, plungers, or other board or element control devices 104 such that the advancing speed and position of the element may be controlled and its position identified. The position control module 118 may, thus, facilitate controlled motion of the element past the print heads in the printing device 100. The speed of advancement controlled by the position control module 118 may be coordinated with the print control module 122 such that the printing occurs at a suitable rate to provide the intended result. The position control module 118 may also include a position sensing module 120 that may be in communication with an encoder wheel or other position sensing element or series of position sensing elements, for example, such that the position of the element may be identified and/or verified. This sensing module 120 may, thus, be configured to adjust the understood position of the element to be printed on and account for slippage or other movements inconsistent with the anticipated position of the element based on the movement controlled by the position control module 118. Accordingly, the position sensing module 120 may be in communication with the print control module 122 to provide for adjustments in the timing as the print control module 122 controls print devices 108, heads, and the like.

In the case of a position sensing module 120, apart from a print control module 118, the position sensing module 120 may be in communication with an encoder wheel, optical reader, or other position sensing element 106 or series of position sensing elements. The position sensing module 120 may be in communication with the print control module 122 such that the position of the element to be printed on may be identified and the printing may occur at a suitable time as the element passes by the print heads.

The print control module 122 may be configured to control the print mechanism or print heads 108. The print control module 122 may be in communication with the element marking generator 116 and may receive print instructions from the element marking generator 116. The print control module 122 may also be in communication with the position control 118 and/or sensing module 120 such that the print mechanism 108 may be actuated at suitable times to position the markings in a suitable position as defined by the element marking generator 116. As discussed, the printing process may be configured as a one pass printing process where all or a majority of the surface of a board may be printed on as the board passes by the print mechanism. As such, depending on the type, size, and orientation of the marking being made, the print control module 122 may be configured to continuously or intermittently actuate particular portions of the print mechanism 108 to create the desired marking. It is to be appreciated that the print mechanism control may be particularly adapted to the type of print mechanism being used and may be part and parcel with the print mechanism as a software module that is installed when the print mechanism is associated with the system. In this embodiment, the element marking generator 116 may be configured to prepare instructions for printing in a language and/or format suitable for the drivers and/or software of the print mechanism.

In addition to the computing component 102 that has been described in detail, and as mentioned with reference to FIG. 1, the system may include a conveyance system 110 such as a table, rack, or track for positioning the element for marking and/or advancing the element past the print head or heads 108. In some embodiments, this device 110 may be present as part of a saw 50. In other embodiments, the device 110 may be separate from or apart from such a saw 50. The conveyance system 110 may include a flat table and/or a series of supporting rollers defining a channel or track along which the lumber may be advanced for sawing and/or printing. The channel or track may allow for the position of the lumber to be anticipated such that variability in one or two dimensions is substantially controlled leaving the longitudinal motion through the channel or track as a single variable that may be monitored for purposes of timing the print procedure. Other elements such as position control 104, sensing 106, and print mechanism 108 may, thus, be arranged around the channel or track for interacting with the lumber in suitable fashion. In some embodiments, the conveyance system 110 cause an element to move toward a device or it may take over for controlling longitudinal motion of the lumber or truss element after the lumber or truss element leaves or exits a saw or printer, for example. In some embodiments, the conveyance system may be a part of the saw, printer, or combined system and may have elements for controlling the system throughout the pathway of travel of the lumber. In some cases, particular aspects of the conveyance system may be configured with rollers or other position control elements 104 such that the position of the lumber or truss element may be controlled before and/or after it leaves the saw or printer.

The system may include a position controlling 104 and/or position sensing 106 element for controlling the position of the lumber and/or assessing the relative position of the element and a print head or heads 108. The position control element 104 may be in communication with the position control module 118 of the computing component 102 and may include one or a combination of elements such as rollers, plungers, carriages and the like. It is to be appreciated that while rollers 104 have been shown in FIG. 1 leading into the saw, additional rollers 104 or other position control elements 104 may be provided on the exit side of the saw such that when the lumber or truss element is cut free from the trailing end of the lumber being fed into the saw, the position of the lumber and/or truss element may continue to be controlled. Still further, when the trailing end of the lumber or truss element moves out of the saw and free from the saw rollers 104, the conveyance system may include additional position control elements 104 for continuing to control and/or advance the lumber or truss element. In some embodiments, these elements may be present on a saw 50 for cutting the lumber and may be actuated by systems and methods for advancing the lumber through the saw 50. In other embodiments, these elements may be separated from or apart from the saw 50. In the case of rollers 104, rollers may be provided that grip the lumber as it passes through the device. The rollers 104 may be arranged along the channel or track such as along the sides of the track, for example. The rollers 104 may have a resilient surface or the rollers 104 may have a knurled or roughened surface for gripping the lumber. In some embodiments, the rollers 104 may be positioned to squeeze or otherwise be pressed against the lumber as it enters the system such that the rollers 104 may engage the surface of the lumber and advance the lumber. In some embodiments, the rollers 104 may be biased by a spring or other biasing mechanism, such that they may accommodate varying sizes of boards, while still gripping the surface of the board. In other embodiments, the rollers 104 may be on a track allowing the position of the rollers 104 to be adjusted for varying sizes of boards and allowing the rollers 104 to be positively biased against the board as the board passes by the rollers 104. The rollers 104 may be run by a motor or other actuation mechanism. The motor or other actuation mechanism may be in communication with the position control module 118 such that the rollers 104 may rotate at a controlled selected speed to advance the lumber at a selected speed past the print mechanism 108.

The position sensing element 106 may be in communication with the position sensing module 120 of the computing component 102 and may be configured to measure and/or sense the presence and longitudinal movement of the lumber as it passes by the element 106. The position sensing element 106 may, thus, communicate with the position sensing module 120 such that the computing component 102 may recognize the position of the lumber. The position sensing element 106 may include an encoder wheel, an optical eye, or another type of position sensing device. In the case of an encoder wheel, the wheel may be positioned to contact the surface of lumber as the lumber passes by the wheel. The wheel may have a resilient, roughed or otherwise tacky surface such that when the lumber passes by, the lumber causes the encoder wheel to rotate. The encoder wheel may be biased against the lumber surface so as to maintain contact with the lumber to avoid skipping or spinning freely. The encoder wheel may be adapted to convert rotation of the wheel to a longitudinal distance based on the radius of the wheel and the amount of rotation incurred. Multiple sensors in one or more forms may be used to assess and/or sense the position of the lumber such that accurate positions may be ascertained and the timing of the printing may be suitably controlled.

The system may also include a print mechanism 108, such as one or more print heads for performing the marking operation. The print mechanism 108 may be arranged adjacent to the track 110 for advancing the board and in communication with the print control module 122. As such, when a board or other lumber element is moved past the print mechanism 108, the print mechanism 108 may be actuated to print on the board. The print mechanism, in some embodiments, may include a multiple head and/or multiple cartridge mechanism such that the full width of a board may be printed on as the board passes by the mechanism in a one-pass print operation. In some embodiments, for example, Hewlett Packard, or other brands of print heads and/or cartridges may be provided.

Having described the system in detail with its various parts, several methods may be performed by the system. In one embodiment, the system may be configured for printing truss diagrams on truss members. In other embodiments, the system may be configured for printing truss plate locations on truss members. In still other embodiments, the system may be configured for printing intersecting member identifiers on truss members. In still other embodiments, the system may be configured for printing one or a combination of these features on truss elements.

Figure 6:
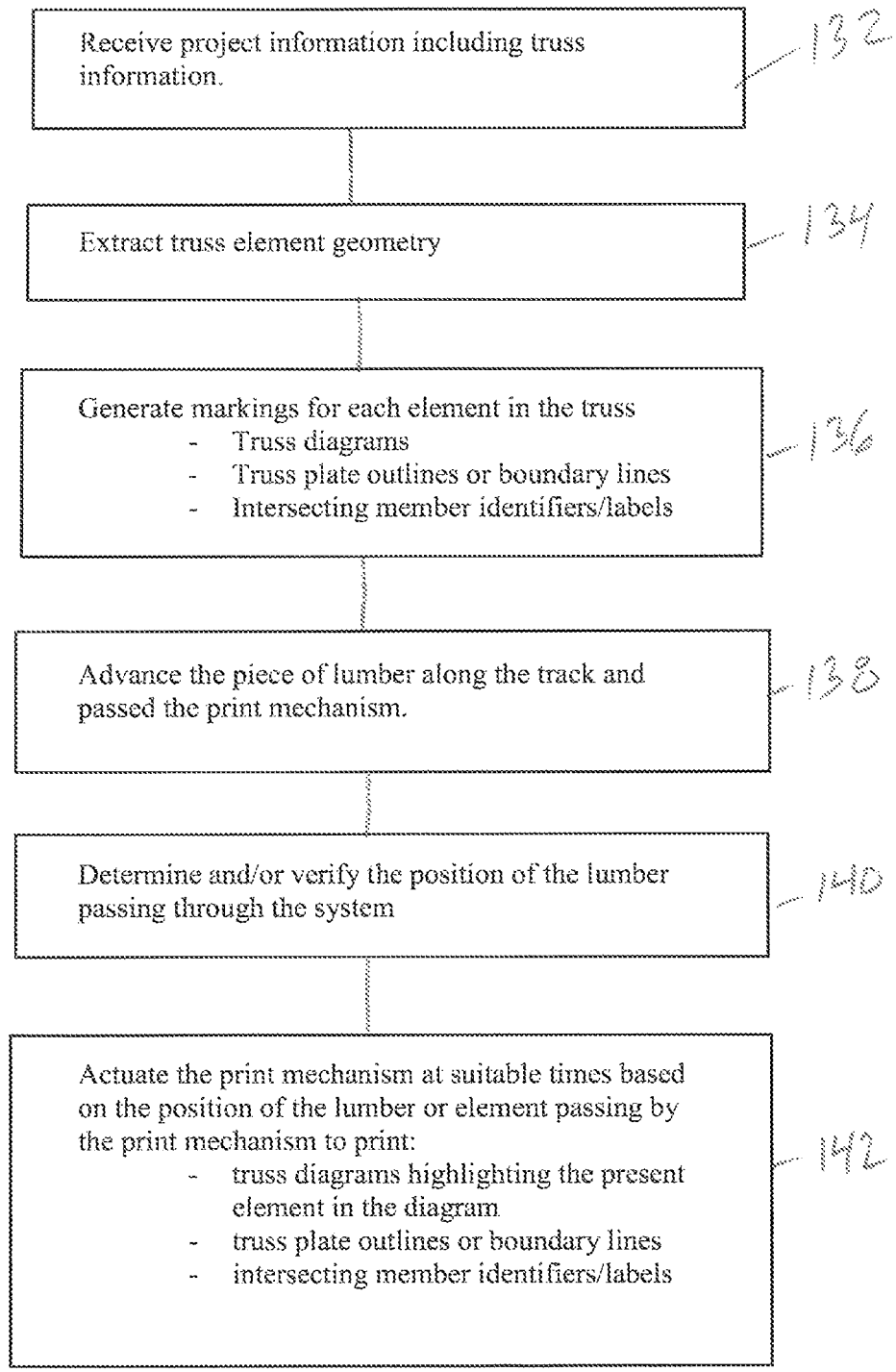
FIG. 6 is a diagram showing several operations performable by the element marking device and/or an associated saw.

Referring now to FIG. 6, a series of operations may be described. As shown, the project input module may download or otherwise receive project information including truss information. 132 The truss information may be in scaled-drawing form, coordinate data form, or another format as mentioned above. The geometry extraction module may access the truss information to isolate individual truss elements from the truss geometry. 134 In some embodiments, this operation may be performed for purposes of developing saw instructions to miter or otherwise cut the ends of the member. In other embodiments, this operation may be performed for purposes of providing to the element marking generator such that markings may be developed that are suitably arranged along the member and relative to edges of member. For example, truss a diagram may be arranged on the member in a particular orientation, truss plate boundary lines may be arranged at particular positions and angles relative to mitered ends of a member, and intersecting member identifiers may be located in relatively close proximity to the ends or sides of the member. The element marking generator may also access the truss information to generate markings for each element in the truss. 136 The element marking generator may, for example, create a truss diagram for printing on each element that highlights which element within the truss the element forms. The element marking generator may, for example, create truss plate boundary lines such as an outline of the truss plate location in a position and orientation where a truss plate overlaps with the truss element. The element marking generator may, for example, also produce printing instructions for intersecting member identifiers for printing at respective ends or along the length of the truss element identifying the element or elements that the member intersects with at the respective locations. The element marking generator may also produce printing instructions for an arrow pointing in the direction of the adjacent and/or adjoining member. The geometry extraction and element marking generation may be performed for each member of a truss and for each truss in a project or for multiple projects and the data may be stored in a database or file, for example, for use by the print control module. The data may be stored such that individual pieces or batches may be run allowing the user to control how many and which pieces may be created. The data may be in a format suitable or readable by the print control module, for example.

The position control and/or sensing module may be activated and may actuate the position control elements and position sensing elements on the system. As such, when the system receives a piece of lumber either from an automated table or from a user, the system may advance the piece of lumber along the track and passed the print mechanism. 138 The position sensing module may communicate with one or more position sensors to determine and/or verify the position of the lumber passing through the system. 140 The print control module may be activated. The print control module may communicate directly with the geometry extraction module and/or the element marking generator or the print control module may access a database or file created by one or more of these modules/generators. The print control module may communicate with the position control and/or sensing modules and may actuate the print mechanism at suitable times based on the position of the lumber or element passing by the print mechanism. 142 The print control module may, thus, actuate the print mechanism to print truss diagrams highlighting the present element in the diagram. The print control module may also actuate the print mechanism to print truss plate boundary lines intersecting member identifiers.

The present system may be used to create truss elements including truss diagrams, truss plate boundary lines, and/or intersecting member identifiers. These elements may, for example, include dimensioned lumber boards such as 2×4's, 2×3's, 2×2's, 2×6's, or other 2× type members. Still other dimensioned lumber sizes may be provided. The system may, thus, create truss elements that are cut to a suitable length for arrangement in the truss and having flat, mitered, doubly mitered, or compound miter cuts at one or more ends. The system may also create a truss diagram on the truss element and, thus, the element may include a truss diagram identifying which member of the truss the element forms. This may include an outline of the truss where the element formed may be shaded or filled in to identify it. The diagram may be printed in such a manner that when the diagram is arranged in elevation, the element takes a position consistent with its orientation in the truss. The system may also create an outline of a truss plate showing how the truss plate overlaps with the member allowing for easy placement of the truss plate and easy inspection of the placement of the truss plate. Still further the system may place intersecting member identifiers on the element identifying at select locations, the members of the truss that intersect with the member at those select locations. Accordingly, in some embodiments, a truss element including a location and orientation defining diagram may be provided. The truss element may also include truss plate locations and intersecting member identifiers. In other embodiments, an entire truss may be provided where each element in the truss includes one or more of a location and orientation defining truss diagram, truss plate locations, and intersecting member identifiers. It should be appreciated that the intersecting member identifiers may be printed in such a manner that when the element is arranged such that the lettering of the identifier is horizontally arranged, the element is arranged in its proper orientation in the truss.

For purposes of this disclosure, any system described herein may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, a system or any portion thereof may be a personal computer (e.g., desktop or laptop), tablet computer, mobile device (e.g., personal digital assistant (PDA) or smart phone), server (e.g., blade server or rack server), a network storage device, or any other suitable device or combination of devices and may vary in size, shape, performance, functionality, and price. A system may include random access memory (RAM), one or more processing resources such as a central processing unit (CPU) or hardware or software control logic, ROM, and/or other types of nonvolatile memory. Additional components of a system may include one or more disk drives or one or more mass storage devices, one or more network ports for communicating with external devices as well as various input and output (I/O) devices, such as a keyboard, a mouse, touch-screen and/or a video display. Mass storage devices may include, but are not limited to, a hard disk drive, floppy disk drive, CD-ROM drive, smart drive, flash drive, or other types of non-volatile data storage, a plurality of storage devices, or any combination of storage devices. A system may include what is referred to as a user interface, which may generally include a display, mouse or other cursor control device, keyboard, button, touchpad, touch screen, microphone, camera, video recorder, speaker, LED, light, joystick, switch, buzzer, bell, and/or other user input/output device for communicating with one or more users or for entering information into the system. Output devices may include any type of device for presenting information to a user, including but not limited to, a computer monitor, flat-screen display, or other visual display, a printer, and/or speakers or any other device for providing information in audio form, such as a telephone, a plurality of output devices, or any combination of output devices. A system may also include one or more buses operable to transmit communications between the various hardware components.

One or more programs or applications, such as a web browser, and/or other applications may be stored in one or more of the system data storage devices. Programs or applications may be loaded in part or in whole into a main memory or processor during execution by the processor. One or more processors may execute applications or programs to run systems or methods of the present disclosure, or portions thereof, stored as executable programs or program code in the memory, or received from the Internet or other network. Any commercial or freeware web browser or other application capable of retrieving content from a network and displaying pages or screens may be used. In some embodiments, a customized application may be used to access, display, and update information.

Hardware and software components of the present disclosure, as discussed herein, may be integral portions of a single computer or server or may be connected parts of a computer network. The hardware and software components may be located within a single location or, in other embodiments, portions of the hardware and software components may be divided among a plurality of locations and connected directly or through a global computer information network, such as the Internet.

As will be appreciated by one of skill in the art, the various embodiments of the present disclosure may be embodied as a method (including, for example, a computer-implemented process, a business process, and/or any other process), apparatus (including, for example, a system, machine, device, computer program product, and/or the like), or a combination of the foregoing. Accordingly, embodiments of the present disclosure may take the form of an entirely hardware embodiment, an entirely software embodiment (including firmware, middleware, microcode, hardware description languages, etc.), or an embodiment combining software and hardware aspects. Furthermore, embodiments of the present disclosure may take the form of a computer program product on a computer-readable medium or computer-readable storage medium, having computer-executable program code embodied in the medium, that define processes or methods described herein. A processor or processors may perform the necessary tasks defined by the computer-executable program code. Computer-executable program code for carrying out operations of embodiments of the present disclosure may be written in an object oriented, scripted or unscripted programming language such as Java, Perl, PHP, Visual Basic, Smalltalk, C++, or the like. However, the computer program code for carrying out operations of embodiments of the present disclosure may also be written in conventional procedural programming languages, such as the C programming language or similar programming languages. A code segment may represent a procedure, a function, a subprogram, a program, a routine, a subroutine, a module, an object, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In the context of this document, a computer readable medium may be any medium that can contain, store, communicate, or transport the program for use by or in connection with the systems disclosed herein. The computer-executable program code may be transmitted using any appropriate medium, including but not limited to the Internet, optical fiber cable, radio frequency (RF) signals or other wireless signals, or other mediums. The computer readable medium may be, for example but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device. Computer-readable media includes, but is not to be confused with, computer-readable storage medium, which is intended to cover all physical, non-transitory, or similar embodiments of computer-readable media.

Various embodiments of the present disclosure may be described herein with reference to flowchart illustrations and/or block diagrams of methods, apparatus (systems), and computer program products. It is understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks. Alternatively, computer program implemented steps or acts may be combined with operator or human implemented steps or acts in order to carry out an embodiment of the invention.

Additionally, although a flowchart may illustrate a method as a sequential process, many of the operations in the flowcharts illustrated herein can be performed in parallel or concurrently. In addition, the order of the method steps illustrated in a flowchart may be rearranged for some embodiments. Similarly, a method illustrated in a flow chart could have additional steps not included therein or fewer steps than those shown. A method step may correspond to a method, a function, a procedure, a subroutine, a subprogram, etc.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an ingredient or element may still actually contain such item as long as there is generally no measurable effect thereof.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

What is claimed is:

1. A device for cutting and marking a truss element of a truss, comprising:
   a saw having a blade configured for cutting a leading end or a trailing end of a lumber element fed past the saw blade to create a truss element and including position control elements configured to feed the lumber element past the saw;
   a print mechanism arranged adjacent to and in series with the saw and configured to print selected truss information on the lumber element moving passed the print mechanism, the selected truss information comprising an element identifying truss diagram;
   a position sensing device configured to sense the position of the lumber relative to the print mechanism; and
   a computing component, the computing component comprising:
      an element marking generator for generating print instructions for the selected truss information, the generating comprising:
         receiving the selected truss information from a truss design system;
         establishing a location along the truss element for the selected information;
         establishing which truss element of the truss is being cut and marked; and
         creating the element identifying truss diagram by highlighting the truss element within the element identifying truss diagram;
      a position sensing module for interfacing with the position sensing device to ascertain the position of the lumber element; and
      a print control module for controlling the print mechanism to print the selected truss information at the established location.

2. The device of claim 1, wherein the element identifying truss diagram is also an orientation identifying truss diagram.

3. The device of claim 2, wherein the element and orientation identifying truss diagram includes a diagram of the truss that highlights the element within the truss that the truss element forms.

4. The device of claim 3, wherein the diagram of the truss is oriented on the element such that when the element is oriented to show the diagram in a truss elevation position, the element is oriented in its truss installed orientation.

5. The device of claim 1, wherein the selected truss information comprises a truss plate location and the truss plate location comprises an outline on the element defining the overlapping location of a portion of a truss plate.

6. The device of claim 1, wherein the print control module is in communication with the position sensing module to actuate the print mechanism at suitable times.

7. The device of claim 1, further comprising a conveyance system and a position control device configured for advancing the lumber element along the conveyance system.

8. The device of claim 7, wherein the computing component further comprises a position control module for interfacing with the position control device to control the timing and/or speed of advancement of the lumber element.

9. The device of claim 1, wherein the saw is a linear saw.

10. The device of claim 1, wherein the print mechanism is arranged to print on the lumber element to be or having been cut by the saw.

11. The device of claim 1, wherein the position sensing device comprises an encoder wheel arranged to contact the lumber element moving along the conveyance system.

* * * * *